United States Patent
John et al.

(10) Patent No.: US 7,941,827 B2
(45) Date of Patent: May 10, 2011

(54) MONITORING NETWORK TRAFFIC BY USING A MONITOR DEVICE

(75) Inventors: Pramod John, Hayward, CA (US); Tsehua A. Chen, Saratoga, CA (US); Mitchell T. Christensen, Livermore, CA (US); Maxine R. Erlund, Cupertino, CA (US)

(73) Assignee: Packetmotion, Inc., San Jose, CA (US)

( * ) Notice: Subject to any disclaimer, the term of this patent is extended or adjusted under 35 U.S.C. 154(b) by 873 days.

(21) Appl. No.: 11/398,014

(22) Filed: Apr. 4, 2006

(65) Prior Publication Data

US 2006/0179141 A1    Aug. 10, 2006

Related U.S. Application Data

(63) Continuation-in-part of application No. 11/042,842, filed on Jan. 25, 2005.

(60) Provisional application No. 60/548,047, filed on Feb. 26, 2004.

(51) Int. Cl.
G06F 17/30 (2006.01)

(52) U.S. Cl. ..................................... 726/4; 726/3; 726/2

(58) Field of Classification Search .................. 726/4, 3, 726/2
See application file for complete search history.

(56) References Cited

U.S. PATENT DOCUMENTS

| | | |
|---|---|---|
| 5,774,650 A | 6/1998 | Chapman et al. |
| 5,787,253 A | 7/1998 | McCreery et al. |
| 6,219,706 B1 | 4/2001 | Fan et al. |
| 6,233,577 B1 | 5/2001 | Ramasubramani et al. |
| 6,292,838 B1 | 9/2001 | Nelson |
| 6,301,658 B1 | 10/2001 | Koehler et al. |
| 6,466,932 B1 | 10/2002 | Dennis et al. |
| 6,519,571 B1 | 2/2003 | Guheen et al. |
| 6,553,428 B1 | 4/2003 | Ruehle et al. |
| 6,622,151 B1 | 9/2003 | Hamamoto et al. |
| 6,651,099 B1 | 11/2003 | Dietz et al. |
| 6,662,227 B2 | 12/2003 | Boyd et al. |
| 6,804,701 B2 | 10/2004 | Muret et al. |
| 6,871,284 B2 | 3/2005 | Cooper et al. |

(Continued)

FOREIGN PATENT DOCUMENTS

EP    1054529 A2    11/2000

OTHER PUBLICATIONS

John Sawyer, "PacketMotion PacketSentry 2.0.3" Network Computing, Network & System Management, Feb. 13, 2006.*

(Continued)

*Primary Examiner* — David Y Jung
(74) *Attorney, Agent, or Firm* — Nixon Peabody LLP (57) ABSTRACT

A solution is provided for associating network traffic traversing on a networked environment according to a selected category item, such as a user name or other network entity identity-related information, by using a monitor device. The solution includes: obtaining user information from the directory service by obtaining at least one set of user object attributes from the directory service; identifying at least one authentication exchange packet from packets traversing on the networked environment; extracting a user ID and a network address from the authentication exchange packet; filtering or selecting packets traversing on the network environment that each have a network address equivalent to the extracted network address; and associating packets that were selected with user information having a name attribute equivalent to the extracted user ID.

57 Claims, 4 Drawing Sheets

U.S. PATENT DOCUMENTS

| | | | |
|---|---|---|---|
| 6,983,379 | B1 | 1/2006 | Spalink et al. |
| 7,020,082 | B2 | 3/2006 | Bhagavath et al. |
| 7,085,936 | B1 | 8/2006 | Moran |
| 7,133,916 | B2 | 11/2006 | Schunemann |
| 7,216,162 | B2 | 5/2007 | Amit et al. |
| 7,433,943 | B1 | 10/2008 | Ford |
| 2001/0032258 | A1 | 10/2001 | Ishida et al. |
| 2001/0039579 | A1 | 11/2001 | Trcka et al. |
| 2002/0032855 | A1 | 3/2002 | Neves et al. |
| 2002/0110084 | A1 | 8/2002 | Butt et al. |
| 2002/0131764 | A1 | 9/2002 | David et al. |
| 2003/0135553 | A1 | 7/2003 | Pendakur |
| 2003/0163581 | A1 | 8/2003 | Moran et al. |
| 2003/0172143 | A1 | 9/2003 | Wakayama |
| 2003/0177383 | A1 | 9/2003 | Ofek et al. |
| 2004/0008972 | A1 | 1/2004 | Haken |
| 2004/0049294 | A1 | 3/2004 | Keene et al. |
| 2004/0071130 | A1 | 4/2004 | Doerr et al. |
| 2004/0078391 | A1 | 4/2004 | Excoffier et al. |
| 2004/0088537 | A1 | 5/2004 | Swander et al. |
| 2004/0117434 | A1 | 6/2004 | Bantz et al. |
| 2004/0133589 | A1 | 7/2004 | Kiessig et al. |
| 2004/0254919 | A1 | 12/2004 | Giuseppini |
| 2005/0050338 | A1 | 3/2005 | Liang et al. |
| 2005/0089048 | A1 | 4/2005 | Chittenden et al. |
| 2006/0123078 | A1 | 6/2006 | Mendiola et al. |
| 2007/0050846 | A1 | 3/2007 | Xie et al. |

OTHER PUBLICATIONS

Closing internal User Visibility and Data Governance Gaps with PacketMotion, SANS Institute, Mar. 2008.*

X.500 and LDAP security: a comparative overview; Hassler, V.; Network, IEEE vol. 13, Issue 6, Nov.-Dec. 1999 pp. 54-64.*

Threat modeling for virtual directory services; Claycomb, W.R.; Dongwan Shin; Security Technology, 2009. 43rd Annual 2009 International Carnahan Conference on Oct. 5-8, 2009 pp. 149-154.*

Design and implementation of secure Web-based LDAP management system; Yang, C.S.; Liu, C.Y.; Chen, J.H.; Sung, C.Y.; Information Networking, 2001. Proceedings. 15th International Conference on Jan. 31-Feb. 2, 2001 pp. 259-264.*

Office Action for U.S. Appl. No. 11/042,842, mailed Feb. 12, 2009.

Office Action for U.S. Appl. No. 11/042,842, mailed Sep. 21, 2009.

Office Action for U.S. Appl. No. 11/398,028, mailed Sep. 2, 2009.

PacketMotion Product Overview, print date: 2009.

PacketMotion Corporate Overview, print date: 2009.

PacketMotion Interview, print date: 2009.

Office Action for U.S. Appl. No. 11/398,013, mailed Jan. 9, 2009.

Office Action for U.S. Appl. No. 11/042,842, mailed Mar. 8, 2010.

Office Action for U.S. Appl. No. 11/440,663, mailed Mar. 3, 2010.

Office Action in U.S. Appl. No. 11/398,013, mailed May 12, 2010.

Notice of Allowance in U.S. Appl. No. 11/398,028, mailed May 12, 2010.

Junaid, M. et al., "Per Packet Authentication for IEEE 802.11 wireless LAN", Multitopic Conference, 2008, INMIC 2008, IEEE International Publication Year: 2008, pp. 207-212.

Huang, C. et al., "One Pass Authentication and Key Arrangement Procedure in IP Multimedia Subsystem for UMTS", Advanced Information Networking and Applications, 2007. AINA '07, 21st International Conference on Publication Year 2007, pp. 482-489.

Iqbal, M.S. et al., "Packet Level Access Control Scheme for Internetwork Security", Communications, Speech and Vision, IEE Proceedings I, vol. 139, Issue 2. Publication Year: 1992, pp. 165-175.

Office Action in U.S. Appl. No. 11/042,842, mailed Oct. 13, 2010.

Office Action in U.S. Appl. No. 11/440,663, mailed Oct. 13, 2010.

Office Action in U.S. Appl. No. 11/398,028, mailed Nov. 3, 2010.

Office Action for U.S. Appl. No. 11/398,013, mailed Jan. 20, 2011.

* cited by examiner

MONITORING NETWORK TRAFFIC BY USING A MONITOR DEVICE

CROSS-REFERENCE TO RELATED APPLICATIONS

This application is a continuing-in-part application, which claims the benefit of United States patent application, entitled "Secure Enterprise Network", having Ser. No. 11/042,842 and a filing date of 25 Jan. 2005, which in turn claims the benefit of United States provisional patent application, entitled "Secure Enterprise Network," having Ser. No. 60/548,047 and the filing date of 26 Feb. 2004.

FIELD OF THE INVENTION

The present invention generally pertains to monitoring network traffic generated on a networked environment. More specifically, the present invention pertains to associating network packets according to a selected category, such as information related to a real user, including user name, group, organizational unit or other category used or defined in a networked environment, by using a monitor device.

BACKGROUND OF THE INVENTION

The term "computer network" generally refers to a system for enabling communication between or among computers or equivalent computing devices. When configured to include a server providing a directory service, the computer network becomes an integrated distributed computing environment, hereinafter "networked environment", where authenticated computing devices and users of these devices can utilize network resources, such as by using or sharing data or attached peripherals, or communicate with each other. Communication on a networked environment is commonly achieved by using a "network packet," or sometimes simply referred to as a "packet." The term "network traffic" is commonly used to refer to either a single packet or collective group of packets that are traversing on the networked environment at a given moment.

In order to use these network resources, a user, sometimes referred to as a real user, usually logs onto the networked environment that provides access to these network resources. Attempting to log-on to a networked environment initiates an authentication process. During the authentication process, the user will attempt to log-on to networked environment by entering a user name and password on a computing device. The device will request credentials from an authentication service provided by the networked environment.

The computing device sends the request for credentials to the authentication service in the form of an authentication request packet that includes the user name. If the user name is valid, the authentication service will authenticate the user name of the real user by, among other things, replying with an authentication response packet, which may contain a session key encrypted with the password. The session key permits the real user's computing device to use and communicate with network resources on the networked environment. The authentication request packet and authentication response packet are sometimes respectively referred to as an authentication exchange request packet and an authentication exchange response packet under the Kerberos protocol.

However, the above approach has its limitations because it relies on a trusted computing concept. Once a user name, or other network entity, is authenticated, that user name becomes a trusted network entity on the networked environment and has access to network resources, such as data, on the networked environment usually limited by only the security policy defined for that authenticated user name and the lifetime of the session key granted. Consequently, a need exists for monitoring network traffic, and more particularly, for associating certain packets according to a selected category, such as information related to a real user, including user name, group, organizational unit or other category, by using a monitor device.

BRIEF DESCRIPTION OF THE DRAWINGS

The accompanying drawings, which are incorporated in and form a part of this specification, illustrate embodiments of the present invention and, together with the description, serve to explain the principles of the invention.

DETAILED DESCRIPTION OF THE EMBODIMENTS OF THE INVENTION

In the following detailed description, for purposes of explanation, numerous specific details are set forth to provide a thorough understanding of the various embodiments of the present invention. Those of ordinary skill in the art will realize that these various embodiments of the present invention are illustrative only and are not intended to be limiting in any way. Other embodiments of the present invention will readily suggest themselves to such skilled persons having benefit of the herein disclosure.

In addition, for clarity purposes, not all of the routine features of the embodiments described herein are shown or described. It is appreciated that in the development of any such actual implementation, numerous implementation-specific decisions must be made to achieve the developer's specific goals. These specific goals will vary from one implementation to another and from one developer to another. Moreover, it will be appreciated that such a development effort might be complex and time-consuming but would nevertheless be a routine engineering undertaking for those of ordinary skill in the art having the benefit of the herein disclosure.

Element numbers are used throughout this disclosure, including the drawings. The variable "n" is used to indicate the total number of element instances, which may be equal to or greater than the number two.

The various embodiments of the present invention disclose a solution for monitoring network traffic on a networked environment by associating certain packets according to a selected category, such as information related to a real user, including user name, group, organizational unit or other category. Associating packets includes: obtaining an authentication exchange packet from network traffic traversing through a networked environment; extracting a user ID and a network address from the authentication exchange packet, attempting to associate the user ID with user information maintained on the networked environment; and if the attempt is successful, associating packets having a network address that matches the extracted network address with selected user information content. For example, if the user information is in the form of user objects having attributes that include a user name, group ID and organization unit, packets that traverse the networked environment may be associated according to any of these attributes, such as by user name, group ID, organization unit or any combination of these.

Figure 1:
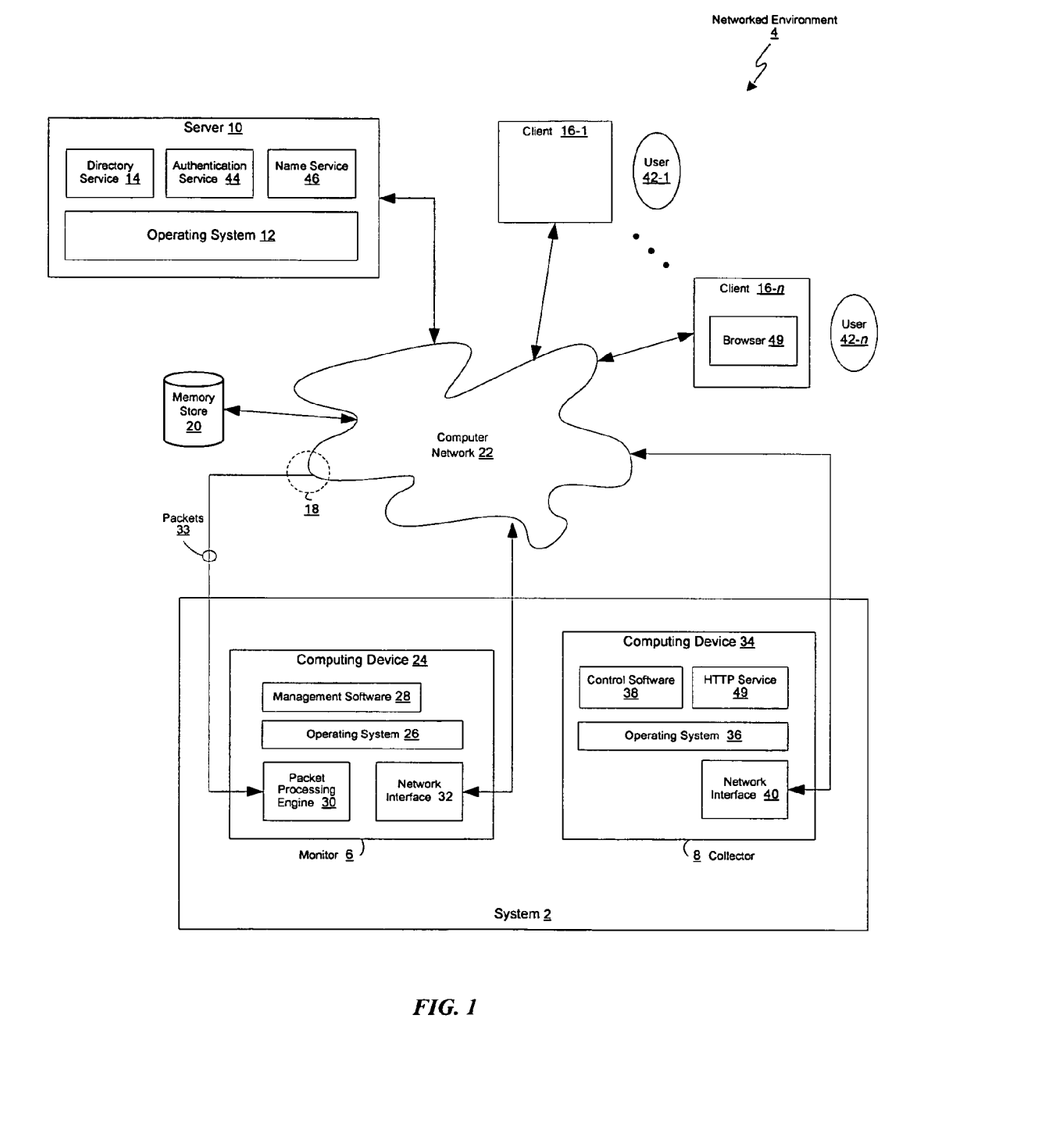
FIG. 1 is a block diagram of a system for associating certain packets according to a selected category by using a monitor device in accordance with one embodiment of the present invention.

FIG. 1 discloses a system 2 for monitoring network traffic on a networked environment 4 by associating certain packets according to a selected category, in accordance with one embodiment of the present invention. System 2 includes a monitor 6 and a collector 8 and is intended for use with a local area network, wide-area network or equivalent networked environment, such as networked environment 4, that includes a server 10 having an operating system 12, and a software application that provides directory services, hereinafter directory service 14, to one or more computing devices, such as clients 16-1 through 16-n. Clients 16-1 through 16-n request and receive directory services from server 10 using a suitable computer network 22. Attachment point 18 and memory store 20 are also shown and may either be part of networked environment 4 or system 2. Server 10 also includes a software application that provides authentication services 44, and in an alternative embodiment, may also include a software application that provides naming services 46.

Monitor Device

Monitor 6 may be implemented using a computing device 24 having at least an operating system 26 and a software application, hereinafter called management software 28, a system bus having at least one expansion slot (not shown) suitable for coupling to a packet processing engine 30, and a network interface 32 for coupling to collector 8 using networked environment 4 via computer network 22. Computing device 24 may be any computer having at least one CPU, a motherboard having system memory, a chipset for supporting the functions of the motherboard, user interfaces, such as keyboard, mouse, and monitor and the system bus, and mass storage, such as a hard disk drive. The system bus may be any bus or interconnect, such as PCI, PCI-X, Hypertransport, PCI express and the like, that is suitable for coupling to the packet processing engine selected, such as packet processing engine 30.

Network interface 32 may be any interface suitable for connecting to computer network 22. For example, if computer network 22 is implemented in the form of a packet-switched Ethernet network, then network interface 32 would be implemented using an Ethernet-compatible network interface card or equivalent. In another example, computer network 22 may be implemented to comply with a cell relay network protocol, such as the ATM (Asynchronous Transfer Mode) protocol, requiring a device, such as computing device 24, connected to computer network 22 to have a network interface, such as network interface 32, that is compatible with the cell relay network protocol or ATM protocol. The ATM protocol is commonly known by those of ordinary skill in the art.

Computing device 24 may be implemented using a motherboard having the model designation "X6DVA-EG" from Supermicro Computer, Inc. of San Jose, Calif. Computing device 24 may be configured with a single 3.60 GHz Xeon processor, one gigabyte of system memory, an 80 GB hard disk drive, an Ethernet-compatible network interface, which is used to implement network interface 32, and an operating system in the form of Linux®, version 2.4.28, available from http://www.kernel.org, which is maintained by the Kernel Dot Org Organization, Inc. of Palo Alto, Calif.

Packet Processing Engine

Packet processing engine 30 may be implemented using a packet processing engine that can receive and process, which includes inspecting and filtering, packets 33 received from attachment point 18, according to criteria specified by management software 28. In one embodiment of the present invention, packet processing engine 30 is implemented using a programmable packet processing engine having the model designation "ENP-2611", from RadiSys Corporation of Hillsboro, Oreg. In this implementation, packet processing engine 30 includes at least one Ethernet port (not shown) for attaching to and receiving packets from attachment port 18. Implementing packet processing engine 30 using model ENP-2611 is not intended to limit the present invention in any way.

One of ordinary skill in the art after receiving the benefit of the herein disclosure would readily recognize that other types of packet processing devices may be used that have the functionality disclosed herein. For example, a general purpose computer may be used alone or in conjunction with at least one network processor, Application Specific Integrated Circuits (ASICs), or a combination of these to provide the disclosed packet processing disclosed herein. Network processors are commonly known, such as the IXP2400 Network Processor, from Intel Corporation, of Santa Clara, Calif. In another example, packet processing engine 30 may be replaced with a network interface (not shown) to receive packets 33 and program code operating on computer device 24 to process packets 33 as disclosed by the various embodiments of the present invention described herein.

Collector

Collector 8 may be implemented using a computing device 34 having at least an operating system 36, a software application, hereinafter referred to as control software 38 and a network interface 40 for connecting to networked environment 4 via computer network 22. Computing device 34 may be any computer having at least one CPU, a motherboard having system memory, a motherboard chipset, mass storage, such as a hard disk drive. For example, computing device 34 may be implemented using the model having the designation "Proliant Dual 140" from Hewlett-Packard of Palo Alto, Calif. The Proliant Dual 140 is configured with a single 3.60 GHz Xeon processor, one gigabyte of system memory, at least one PCI-x expansion slot, an 80 GB hard disk drive and an Ethernet-compatible network interface, which is used to implement network interface 40. In one embodiment of the present invention, computing device 34 operates using Red Hat Enterprise Linux® WS 2.1, available from Red Hat, Inc. of Raleigh, N.C.

In an alternative example of an embodiment of the present invention, collector 8 may include an additional network interface (not shown) which may be used to directly connect to network interface 32, enabling monitor 6 and collector 8 to communicate with each other without the use of networked environment 4.

Computing devices, such as computing device 24 and 34 are known, and thus, a detailed discussion of the hardware configuration of computing device 24 and 34 is not provided to avoid over-complicating the herein discussion.

Networked Environment

Networked environment 4 may be implemented using a client-server network application architecture, which is commonly known by those of ordinary skill in the art, and a computer network, such as computer network 22, having a topology and a physical media suitable for supporting the various embodiments disclosed herein, such as a computer network configured to have a packet-switched network topology using the TCP/IP protocol suite on twisted-pair copper physical media. For example, other networking protocols, such as OSI (Open Systems Interconnection), or data link protocols, such as the ATM protocol, may be used in lieu of the TCP/IP protocol. The ATM and OSI protocols are commonly known by those of ordinary skill in the art.

Moreover, using a client-server network application architecture or twisted-pair copper media is not intended to be limiting in any way. Any type of distributed network architecture may be used as long as devices, such as clients 16-1 through 16-n, and authenticated real users, such as real users 42-1 through 42-n, who have logged-on to clients 16-1 through 16-n, respectively, can request and receive directory services, such as from directory service 14. For example, networked environment 4 may provide access to a server, such as server 10, running a Windows® brand operating system, such as Windows® 2003 Server, which typically includes Active Directory. Active Directory is a LDAP-based directory service and is a product of Microsoft Corporation, of Redmond, Wash.

The various embodiments of the present invention disclosed herein are not limited to Windows® brand operating systems or to Active Directory. Other types of operating systems may be used, including UNIX, Linux®, BSD, and other UNIX variants, Solaris, Mac OS X, and the like. In addition, other types of software applications may be used instead of Active Directory to provide directory services. For example, one of ordinary skill in the art having the benefit of the herein disclosure would recognize that Sun Java Enterprise, available from Sun Microsystems, Inc., of Sunnyvale, Calif.; eDirectory, available from Novell, Inc. of Provo, Utah; and Red Hat Directory Server, available from Red Hat, Inc., Apache Directory Server, available from Apache Software Foundation of Forest Hill, Md., are exemplar directory services that may be used with the various embodiments of the present invention as described herein. Other directory services exist but are not listed to minimize over-complicating this herein disclosure. Further, OpenLDAP, the Kerberos network authentication protocol, hereinafter "Kerberos Protocol", and Samba software may be used to create the directory service functionality described for Active Directory.

The term "directory service" is intended to include a software application that complies with the X.500 standard, which is a commonly known standard developed by the ITU (International Telecommunication Union) and ISO (International Organization for Standardization). A LDAP-based directory service is commonly known and is based on the X.500 standard but uses the TCP/IP protocol. The term "LDAP" is also commonly known and is an acronym for Light Weight Directory Protocol, which is a networking protocol for querying, searching, and modifying directory services running over TCP/IP. LDAP is defined in terms of the Abstract Syntax Notation one, also referred to as ASN.1, which is a joint standard managed by ISO, and the ITU-T (ITU Telecommunication Standardization Sector). ASN.1 is a standard notation for describing data structures used for representing, encoding, transmitting and decoding data. LDAP is suitable for accessing an X.500 standard-compliant directory service, such as Active Directory.

A directory service is typically used to define, manage, and authenticate network entities, such as computing devices, services, and real users. Each network entity is treated as an object by the directory service. Each object has a unique name and a set of attributes, and represents a single network entity, such as a user, a computer, a printer, an application, or a shared data source and their respective attributes ("object attributes"). A directory service, such as Active Directory, creates and manages these objects using a hierarchical framework. This framework arranges objects into three broad categories: resources, such as printers; services and people, such as users and groups. A directory service manages these objects by enabling information to be read from or written to the objects, controlling access to the objects and enforcing security policies defined for the objects. This framework may include arranging these objects to belong to a domain. A directory service, such as Active directory, manages the domain in a "namespace" using its DNS name structure. The objects held within a domain can be grouped into containers called, "organizational units". The organizational unit is one level to apply group policies, called group policy objects in Active Directory.

Figure 2:
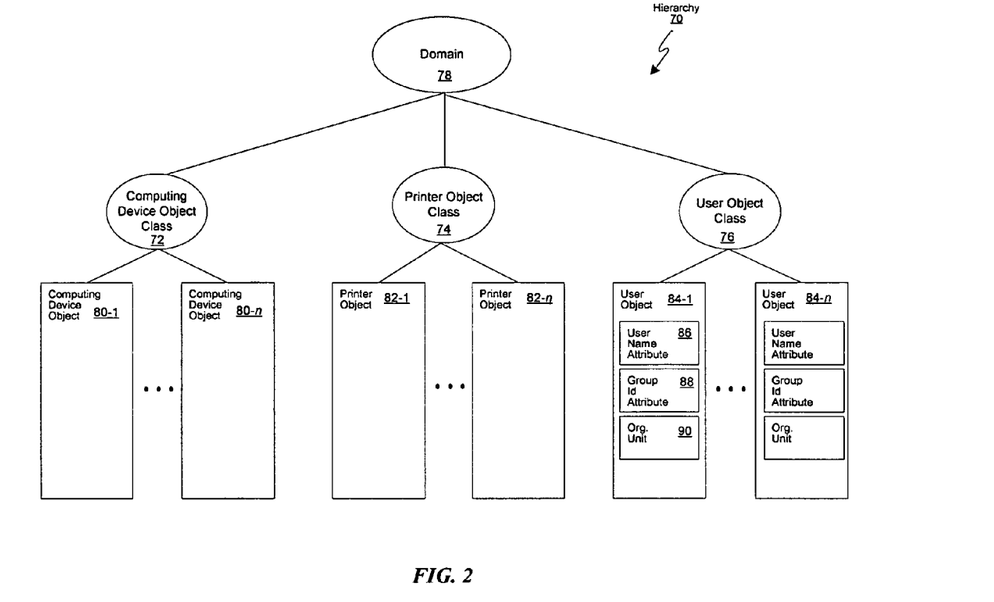
FIG. 2 is a block diagram of an example directory hierarchy in accordance with another embodiment of the present invention.

Turning now to FIG. 2, directory service 14 may have a hierarchy 70 organized according to a selected manner by a system administrator of networked environment 4. Each object in the directory service is typically uniquely identified in the directory and uniquely named for a given namespace, such as a domain. Each object is of a particular object class. For example, hierarchy 70 may include a computing device object class 72, a printer object class 74, and a user object class 76 in a domain 78. Computer objects 80-1 through 80-n represent computing devices, such as clients 16-1 through 16-n, respectively, and belong to computing device object class 72, while printer objects 82-1 through 82-n may represent printers and belong to printer object class 74. Further still, user objects 84-1 through 84-n may represent real users, such as real users 42-1 through 42-n, respectively, and belong to user object class 76.

Each object may have more than one attribute, and each attribute may contain a value. Object attributes define the characteristics of and information related to the entity represented by the object containing the object attributes. For example, a set of attributes defined in user object 84-1 may include user information related to a real user, such as user name attribute 86, group ID attribute 88, and organizational unit attribute 90. User name attribute 86 may be in the form of an email address that has a suffix portion that includes the domain name established for the networked environment and a prefix portion that is unique to the real user. For example, in one embodiment of the present invention, a user name of: "jdoe@packetmotion.com" may be used for real user 42-1. In Active Directory, the user name attribute in a user object is referred to as the "UserPrincipalName" attribute and requires a value that has an e-mail address format, such as the format disclosed in the example above.

A directory service stores objects in a database, or equivalent memory store, according to a selected model, referred to as a schema. The collection of objects stored in the database is sometimes referred to as a directory. The directory service functions as an interface to the database and provides access to objects stored in the database.

Access to the directory service may be accomplished using LDAP, and the Kerberos Protocol may be used to authenticate network entities seeking access to resources on networked environment 4. The Kerberos Protocol is commonly known and not intended to limit in any way the scope and spirit of the present invention as described in the various embodiments disclosed herein. Other types of network authentication protocols may be used if the protocol selected supports the directory service used.

The term "packet" or alternatively, "packet" is intended to mean the basic unit in which data is transmitted on a packet switched network, such as networked environment 4.

Figure 3:
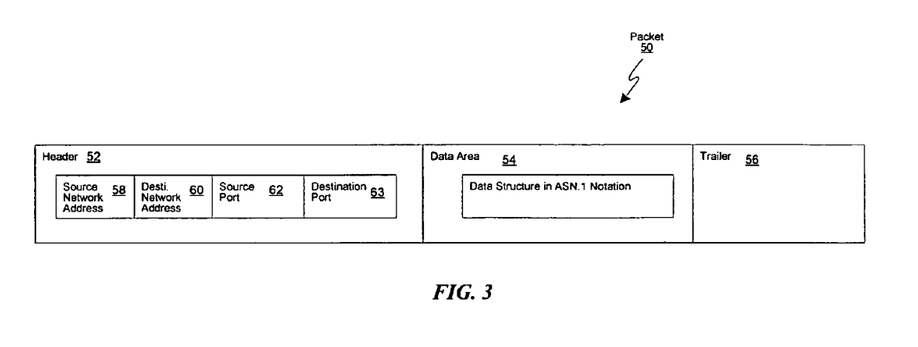
FIG. 3 is a block diagram of an example packet in accordance with yet another embodiment of the present invention.

As shown in FIG. 3, a packet 50 consists of three main elements: a header 52, a data area 54 and a trailer 56. Header 52 includes information describing the source and destination of the packet. The source of the packet is in the form of a network address of the network entity that created the packet and may be referred to as a source network address. The destination of the packet is in the form of a network address of the intended network entity recipient of the packet and may be referred to as a destination network address. Example source network address 58 and destination network address 60 are illustrated in FIG. 3 in block diagram form.

Header 52 also includes two port numbers that are respectively designated as a source port number 62 and a destination port number 63. A port number, sometimes also referred to as a port ID, is commonly used to label a packet to be of a certain type. For example, the number "88" is commonly used to designate a packet as a Kerberos authentication exchange packet when used as a port ID. Thus, if source port number 62 or destination port number ID 63 contains the numeric ID "88" it may indicate that packet 50 is possibly a Kerberos authentication exchange packet but the association between a packet having a port ID of "88" and an actual Kerberos authentication exchange packet is not absolute since port ID designations may not be consistently used or applied.

Data area 54, sometimes referred to as the "payload," contains the data intended to be transmitted by the network entity. Since its fifth version, a Kerberos authentication exchange packet contains content in data area 54 that complies with the ASN.1 notation. In accordance with one embodiment of the present invention, monitor 6 identifies a Kerberos authentication exchange packet by decoding the ASN.1 formatted content in data area 54 to determine whether the content is a Kerberos authentication exchange packet. For example, if the ASN.1 notation used in data area 54 describes a data structure specific to that used in a Kerberos authentication exchange packet, then monitor 6 will designate that packet as a Kerberos authentication exchange packet. This data structure is defined in RFC Title 1510, September 1993, available from the Internet Engineering Task Force (IETF) of the Internet Society (ISOC) of Reston, Va.

In addition to, or in lieu of, decoding the contents of data area 54, monitor 6 may identify Kerberos authentication exchange packets from other packets by designating packets having a source or destination port ID of "88" as Kerberos authentication exchange packets.

Under the Kerberos Protocol, a third party authentication service, such as authentication service 44 in FIG. 1, functions as a trusted source from whom network entities on a networked environment, such as real users 42-1 through 42-n, respectively share a password, commonly referred to as a "secret-key". A network entity, such as real user 42-1, uses a secret-key to prove that she is who she claims to be. The authentication service 44 maintains these secret-keys for each network entity in a database according to a name defined for the network entity. The Kerberos protocol refers to each name as a "principal name". Each principal name is in the format consistent with the naming convention used by directory service 14, such as a real user's e-mail address used on networked environment 4. For example, the e-mail address may be in the form of a prefix before the "@" symbol and a suffix after the "@" symbol, where the prefix is unique to each real user on networked environment 4 and the suffix is the domain served by the directory service 14. If the network entity is a computing device and if directory service 14 is implemented using the Microsoft Active Directory product, the principal name is also in an email format, except the symbol "$" is placed at the end of the prefix and before the "@" symbol.

The Kerberos protocol also defines the method of exchanging the secret-key, which is sometimes referred to as an "authentication exchange" process. Under this process, an initiator, such as computing device used by real user 42-1 sends an authentication exchange request to the authentication service 44 seeking credentials to obtain access to a network entity, such as directory service 14, on networked environment 4. This request is made in the form of an authentication exchange request packet, which contains at least the initiator's principal name and the target network entity's principal name. Upon receipt, authentication service 44 checks whether the principal names received are valid by, among other things, determining whether the initiator's and target network entity's principal names are in the authentication service 44 database.

If the principal names are found valid, authentication service 44 responds with an authentication exchange response packet that contains the principal names previous sent, the initiator's network address and the credentials requested, including the current time, a lifetime value and a temporary encryption key, called a "session key". The authentication service 44 encrypts the contents of the authentication exchange response packet using the initiator's secret-key. After receiving the authentication exchange response packet, the initiator decrypts it by using the initiator's secret key, enabling the initiator to obtain the session key.

The session key can be used to decrypt messages that were encrypted using either the initiator's secret-key or the target network entity's secret-key. Thus, after obtaining the session key, the initiator can encrypt packets using the session key and then send the encrypted packets to the target network entity. Upon receipt, the target network entity can then decrypt the packets using the target network's secret-key, which it already possesses.

Referring again to FIG. 1, service 10 may also provide a name service, such as name service 46, by mapping the names of network resources, such as client 16-1 through 16-n, to their respective network addresses, referred to as IP addresses in a networked environment that uses the TCP/IP protocol suite. Mapping clients with their respective network addresses, permits name service 46 to return the name of the client upon receiving the client's network address or vice versa. For example, if a client 46-1 having the device name of "jdoe_dtop" is designated with an IP address of 192.1.0.100, the name service will return the name "jdoe_dtop" if it receives an IP address of 192.1.0.100. In the reverse, if the name service receives the device name "jdoe_dtop", it will perform a reverse lookup and return the IP address of the device having hostname "jdoe_dtop", which in this example is 192.1.0.100. Name services are commonly known and are available from a variety of vendors. One of ordinary skill in the art would readily recognize without undue experimentation after receiving the benefit of this disclosure that alternative name services may be employed. For example, a server providing DNS (Domain Name System) services may be accessed or used to provide a name service. In addition, WINS (Windows Internet Naming Service), or other name services may be used. DNS and WINS are commonly known.

Computer network 22 enables computing devices to connect and communicate with other devices that are also coupled to networked environment 4. Computer network 22 may be implemented using any physical media that can support the transmission protocol used in networked environment 4. In addition, various types of physical media may be used instead of twisted pair copper physical media, including fiber, coax, wireless, and the like.

Attachment point 18 may be implemented using a network tap or a switch having spanning port or mirror port functionality, which are commonly known. A network tap is typically installed on a computer network segment, such as between two switches on a packet-switched network topology. The network tap either splits or regenerates the packets transmitted through the segment, creating a duplicate set of packets, such as packets 33 in FIG. 1, which may then be sent to a connected device. A switch having a mirror port copies packets received in one standard switch port and sends them to another switch port, which is referred to as a "mirror" port. Unlike standard switch ports, a mirror port cannot support bidirectional traffic and can only transmit the copied or duplicated packets to a connected device. A switch having a spanning port typically indicates that the switch can copy packets received from all standard switch ports available on the switch to a single spanning port. Unlike standard switch ports, a spanning port cannot support bidirectional traffic and can only transmit the copied or duplicated packets to a connected device. In FIG. 1, monitor 6 functions as the connected device receiving the duplicated packets in the above example. It is contemplated that attachment point 18 is strategically placed on computer network 22 so that network traffic transmitted on computer network 22 is duplicated and transmitted to monitor 6. For example, if attachment point 18 is implemented using a switch having a spanning port (not shown), the standard switch ports of the switch either directly or indirectly connect to all computer network segments that comprise computer network 22.

The term "client" includes any computing device that can request and use application functionality, such as directory services, provided by a server, such as server 10, operating on networked environment. In another embodiment of the present invention, the term client may also include any computing device that can respond to a query seeking the log-on status of users having a user account on the client. For example, client 16-1 may be configured with the Microsoft Windows® operating system, such as Windows® XP, to receive and reply to user account query sent by another device using the Server Message Block (SMB) protocol. The SMB protocol is commonly known and a network protocol that supports the sharing of data, files, resources and permits authenticated inter-process communication between computing devices in a networked environment, such as between collector 8 and client 16-1 on computer network 22.

The use of a Windows® operating system or the SMB protocol to submit a user account query to client 16-1 is not intended to limit the present invention in any way. Other types of operating systems can support a user account query, such as UNIX, which includes the "who" remote shell command that is similar to the user account query supported by the Windows® operating system. SAMBA is a commonly known suite of software applications for defining and operating a computer network and includes an open source implementation of the SMB protocol.

The term "computing device" includes any device, such as a general purpose general, server, hand-held device or the like, that includes an operating system, a network interface compatible with computer network 22, and capable of executing application programs or program code. The term "server" is a subset of computing devices and primarily provides application functionality to another device connecting or connected to networked environment 4. Such application functionality may include directory services, mass storage services, e-mail services, web services, and the like. The term "node" includes any computing device, such as system 2, clients 16-1 through 16-n, server 10 and memory store 20, operating on a networked environment, such as networked environment 4 and using a unique network address that was previously granted to the node either manually or automatically, such as through a DHCP, also known as Dynamic Host Configuration Protocol, service (not shown). DHCP services are commonly known.

Server 10 may be implemented using any computer device sufficient to support the server's planned function, such as software-based service applications that include a directory service, e-mail, file system, and the like.

The term "memory store" is intended to include any device, such as a storage server, that is capable of providing at least read and write functionality to a requesting computing device, such as system 2, clients 20-1 through 20-n and server 10. In accordance with one embodiment of the present invention, memory store 20 is implemented using any database server capable of communicating with another computing device on networked environment 4 using the SOAP protocol. For example, memory store 20 may be implemented using a database application, such as ORACLE, configured to operate on database server, such as the database server having model designation Oracle 9G, available form Oracle Corporation of Redwood City, Calif.

The SOAP protocol is commonly known and a protocol for exchanging XML-based messages over a computer network, such as computer network 22. HTTP (hypertext transfer protocol) and the XML language (extensible markup language) are also commonly known. The World Wide Web Consortium commonly referred to as W3C, currently maintain the specifications for SOAP and HTTP.

Using a database server to implement memory store 20 is not intended to limit the scope and spirit of the various embodiments of the present invention disclosed here. One of ordinary skill in the art after receiving the benefit of the herein disclosure would readily recognize that memory store 20 may be implemented on a separate network, such as on a Storage Area Network, commonly referred to as a SAN, implemented using a network attached storage (NAS) device, or implemented using computing device 34 configured with a database application software and a mass storage device, such as hard disk drive or a mass storage array in either a JBOD (Just a Bunch of Disks) or RAID (Redundant Array of Independent Disks) configuration.

Management Software and Control Software

Management software and control software are implemented in a selected programming language, such as C#, and compiled for their target operating system, which for both applications in the example shown in FIG. 1, is the Linux® operating system. During operation, management software 28 executes on computing device 24 and communicates with packet processing engine 30 and control software 38. Control software 38 executes on computing device 34 and communicates with management software 28 and a server running a directory service, such as server 10 and directory service 14, respectively. Management software 28 communicates with packet processing engine 30 using a set of Application Program Interfaces (APIs), such as the programming and runtime libraries specific to the ENP-2611 packet processing engine.

Both management software 28 and control software 38 use the SOAP protocol, version 1.2, over HTTP to communicate with each other through network interfaces 32 and 40, respectively. Although network interfaces 32 and 40 are coupled to each other using computer network 22 of networked environment 4, other approaches may be used, such as by coupling network interfaces 32 and 40 directly using a separate cable, eliminating the need to use networked environment 4. In addition, control software 38 uses the SOAP protocol to communicate with memory store 20 by using the protocol to read and query data stored on, or write data to, memory store 20.

Control software 38 uses the LDAP protocol to communicate with directory service 14. The use of the LDAP protocol is not intended to limit the scope and spirit of the various embodiments of the present invention disclosed herein. Other protocols may be used as long as the protocol selected is compatible with the type of directory service implemented on networked environment 4.

Further, control software 38 communicates with clients, such as clients 16-1 through 16-n, on networked environment 4 using the SMB protocol. Control software 38 includes program code that can structure and send a user account query to a selected client, such as client 16-1. The SMB protocol and user account query are compatible with clients using the Microsoft Windows® brand of operation systems, such as Windows® XP Professional. Those of ordinary skill in the art would readily recognize that control software 38 may be provided with additional program code that supports other types of network protocols for sharing of data, files, resources, and permits authenticated inter-process communication between computing devices, such as collector 8 and client 16-1, on a computer network 22.

Control software 38 obtains user information from a directory service and stores the user information in memory store 20. For example, control software 38 obtains user information in the form of user object attributes, which control software 38 obtains from directory service 14. Control software 38 stores these user object attributes in memory 20 in a suitable form, such as in database table 100, shown in FIG. 4. Control software 38 associates an index to each set of user object attributes, such as user name, group ID, and organizational unit ID, that are defined in a single user object. The term "set of user object attributes" is hereinafter also referred to as an "attribute set". Control software 38 assigns a unique index to each attribute set.

Figure 4:
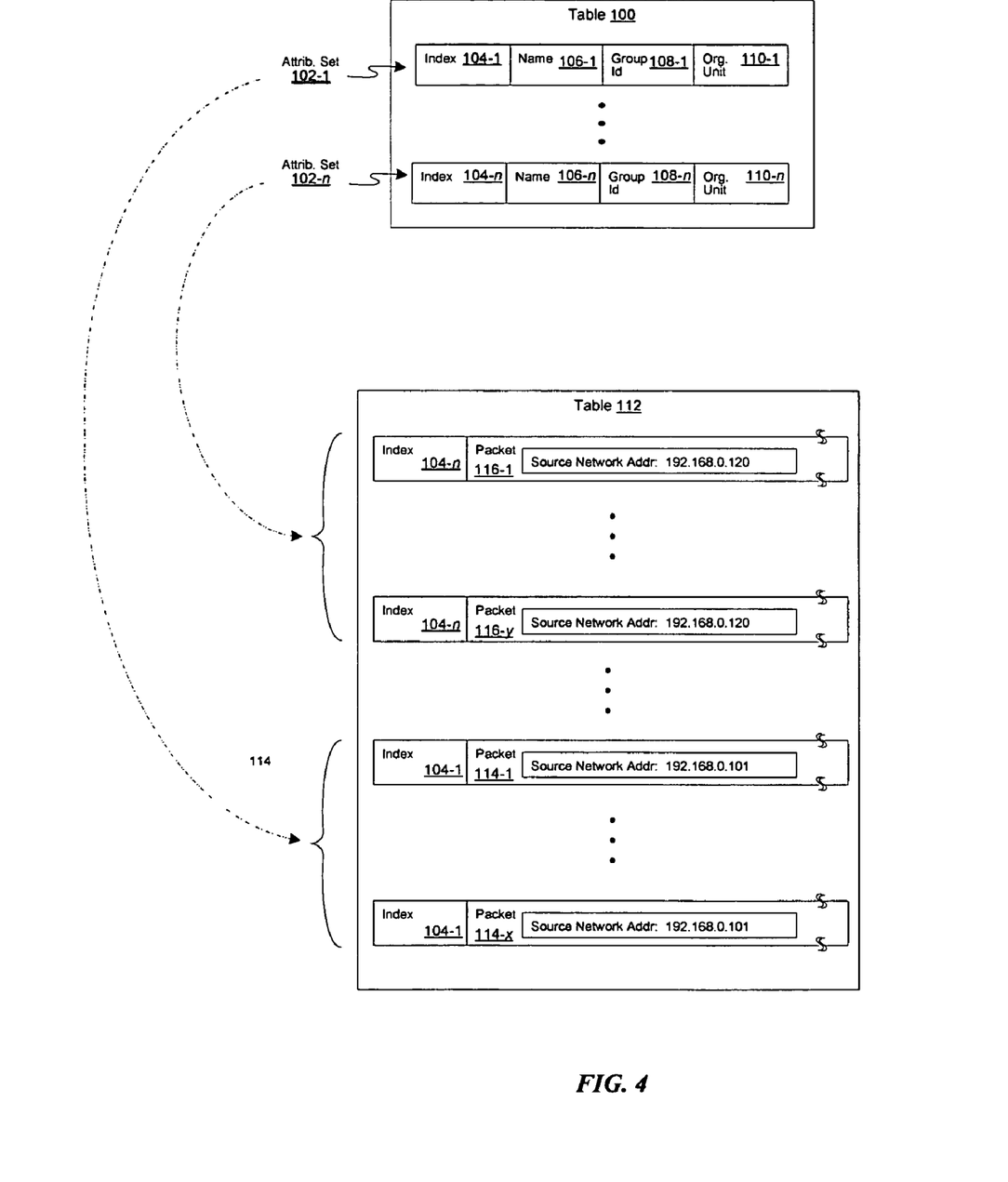
FIG. 4 is a block diagram of example tables for storing object attributes and packets that are associated with the object attributes in accordance with yet another embodiment of the present invention.

For example, user information in the form of attribute sets 102-1 through 102-n are respectively associated with indices 104-1 through 104-n, where n represents the total number of attribute sets stored in database table 100. Attribute set 102-1 may include a user name attribute 106-1, a group ID attribute 108-1 and an organization unit ID attribute 110-1, while attribute set 102-n may include a user name attribute 106-n, group ID attribute 108-n and organizational unit attribute 110-n. Since each attribute set has a unique index and includes a selected number of user object attributes defined for a real user, the unique index can be used as a link to any combination of these user object attributes and in turn, to the real user defined by these user object attributes.

For example, software control 38 uses index 104-1 to link or associate packets 114-1 through 114-x in table 114 with attribute set 102-1 according to a selected criteria by storing index 104-1 with packets 114-1 through 114-x, in table 112, where x represents the total number of packets that have been selected according to a selected criteria. Similarly, for another attribute set, such as attribute set 102-n, software control 38 uses index 104-n, to link or associate packets 116-1 through 116-y in table 114 with attribute set 102-n according to a selected criteria by storing index 104-n with packets 116-1 through 116-y in table 114, where y represents the total number of packets that have been selected according to a selected criteria. As taught in the various examples described herein, a packet having a network address, such as a source or destination network address, that matches a destination network address from an authentication exchange response packet may be used as the selected criteria. However, matching the network address, whether a source or destination, of a packet to a destination network address obtained from an authentication exchange response packet is not intended to limit the various embodiments of the present invention disclosed herein. In another example, a packet having a network address, such as a source or destination network address, that matches a source network address from an authentication exchange request packet may be used as the selected criteria.

If the selected criteria includes using a destination network address extracted from an authentication exchange response packet, control software 38 instructs monitor 6, which is under program control by management software 28, to identify authentication exchange response packets from network traffic transmitted on a networked environment, such as networked environment 4. If the selected criteria includes using a source network address extracted from an authentication exchange request packet, control software 38 instructs monitor 6 to identify authentication exchange request packets instead. The network traffic may be in the form of packets, such as packets 33 in FIG. 1, received by monitor 6 from an attachment point, such as attachment point 18.

In response to receiving the above request from control software 38, management software 28, will cause packet processing engine 30 to identify authentication exchange packets of the required type, such as a request or response type, and to assert the proper signals on the expansion bus of computing device 24 so that monitor 6 can receive the identified authentication exchange packets and forward them to collector 8 operating under program control of control software 38. Management software 28 and control software 38 communicate using the SOAP protocol although the use of this protocol is not intended to limit the scope and spirit of the various embodiments of the present invention.

Monitor 6 identifies authentication exchange packets from packets 33 by inspecting each packet and determining whether the inspected packet includes content that would indicate that it is an authentication exchange packet. For example, monitor 6 identifies a packet as an authentication exchange packet if it has a data structure that complies with the data structure defined by ASN.1 for Kerberos authentication exchange packets. In another example, monitor 6, identifies a packet as an authentication exchange packet if it contains a port ID of "88". Although a port ID of "88" is typically used by software applications to designate packets as Kerberos authentication exchange packets, identifying packets by port ID may not be a reliable method of determining packet type since port ID designations may not be consistently used.

After identifying a packet as an authentication exchange packet, monitor 6 extracts the user ID and a network address contained in the authentication exchange packet and sends them to collector 8 using the SOAP protocol. If the authentication exchange packet is a Kerberos authentication exchange packet, the extracted user ID is in the form of a Kerberos principal name. In this example, authentication exchange packets identified are of the authentication exchange response packet type and thus the type of network address extracted by monitor 6 is a destination network address. In another example, monitor 6 may instead be configured to identify an authentication exchange request packet, and if so, monitor 6 will extract a source network address from the authentication exchange request packet.

Upon receiving the extracted user ID and the network address, which in this example is a destination network address, control software 38 validates the user ID and network address. Validation may include determining whether the user ID includes a user name that matches a user name attribute in one of the user objects previously stored in memory store 20. If so, control software 38 validates the network address by determining whether real user 42-1 is logged on to a client that was used to initiate the authentication exchange.

Determining whether real user 42-1 is logged onto the client that was used to initiate the authentication exchange may be accomplished by including program code in control software 38 that can request the hostname of the client from a name service, such as name service 46, that is available on a networked environment. In the request, control software 38 includes the extracted network address. Name service 46 responds by performing a reverse look-up, and if a hostname exists that has been assigned the same network address as that of the extracted network address, name service 46 will reply with that hostname.

After receiving the hostname from name service 46, control software 38 sends a user account query, or equivalent, to the client having the hostname sent by the name service. If the client responds by indicating that a user account associated with real user 42-1 is currently logged onto the client, then control software 38 associates the unique index assigned to the user information, such as index 104-1, to packets having a network address that matches the network address extracted from the authentication exchange packet. Monitor 6 receives these packets from attachment point 18, which obtains the packets from computer network 22. Thus, packets associated with real user 42-1 can be used to determine the type and amount of network traffic that originates from real user 42-1 or from a client, which in this example is client 16-1, with the extracted network address.

For example, still referring to FIG. 4, if an extracted network address is in the form of an IP address of "192.168.0.101," monitor 6 will attempt to identify packets having a source or destination network address equivalent to the extracted network address, which in this example is "192.168.0.101", from packets received from attachment point 18. Packets having a source network address of "192.168.1.101 are shown in FIG. 4 as packets 114-1 through 114-x, where x represents the number of packets identified by monitor 6 to have a source network address that is the same as the extracted network address. Monitor 6 sends packets 114-1 through 114-x, to collector 8 for storage in table 112 with each packet associated with the same unique index, such as index 104-1, that was previously associated with the user information matched to the authentication exchange packet, which in this example is attribute set 102-1.

In accordance with another embodiment of the present invention, collector 8 stores packets 114-1 through 114-x in a different form by limiting the amount of packet information stored. For example, if packets 114-1 through 114-x relate to an FTP transfer, collector 8 extracts the file subject to the FTP transfer and the name of the FTP server involved in the transfer, stores this information instead of the entire content of packets 114-1 through 114-x. This reduced set of information related to packets 114-1 through 114-x is hereinafter referred to as metadata.

Similarly, if another extracted network address is in the form of an IP address of "192.168.0.120," monitor 6 will attempt to identify packets having a source or destination network address of "192.168.0.120" from packets received from attachment point 18. Packets having a source network address of "192.168.1.120 are shown in FIG. 4 as packets 116-1 through 116-y, where y represents the number of packets identified by monitor 6 to have a source network address that is the same as the extracted network address. Monitor 6 sends packets 116-1 through 116-y, to collector 8 for storage in table 112 with each packet associated with the same unique index, such as index 104-n, that was previously associated with the user information matched to the authentication exchange packet, which in this example is attribute set 102-n.

Once the packets are associated with an attribute set, such as attribute set 102-1, any attribute saved in table 100 that corresponds with attribute set 102-1 can now be used to search for these packets. In essence, the attributes stored with attribute set 102-1 can be said to be associated with these packets. The alternative is also true. A particular packet or set of packets stored in table 112 can be used to search for a particular attribute. By providing this type of association between or among packets traversing on a networked environment and selected user information, such as user name, group ID, organizational unit or any combination of these, an administrator of system 2 can monitor the network traffic generated or received by a real user that corresponds to the selected user information or category.

Collector 8, as seen in FIG. 1, may also be configured to include a HTTP software application that provides a HTTP service 48. Control software 38 uses HTTP service 48 to provide access to table 100 and table 112 to any computing device, such as client 16-n, on networked environment 4 having a HTTP-compatible browser 49, such as Mozilla Firefox or Internet Explorer. HTTP services and http-compatible browsers are commonly known.

Figure 5:
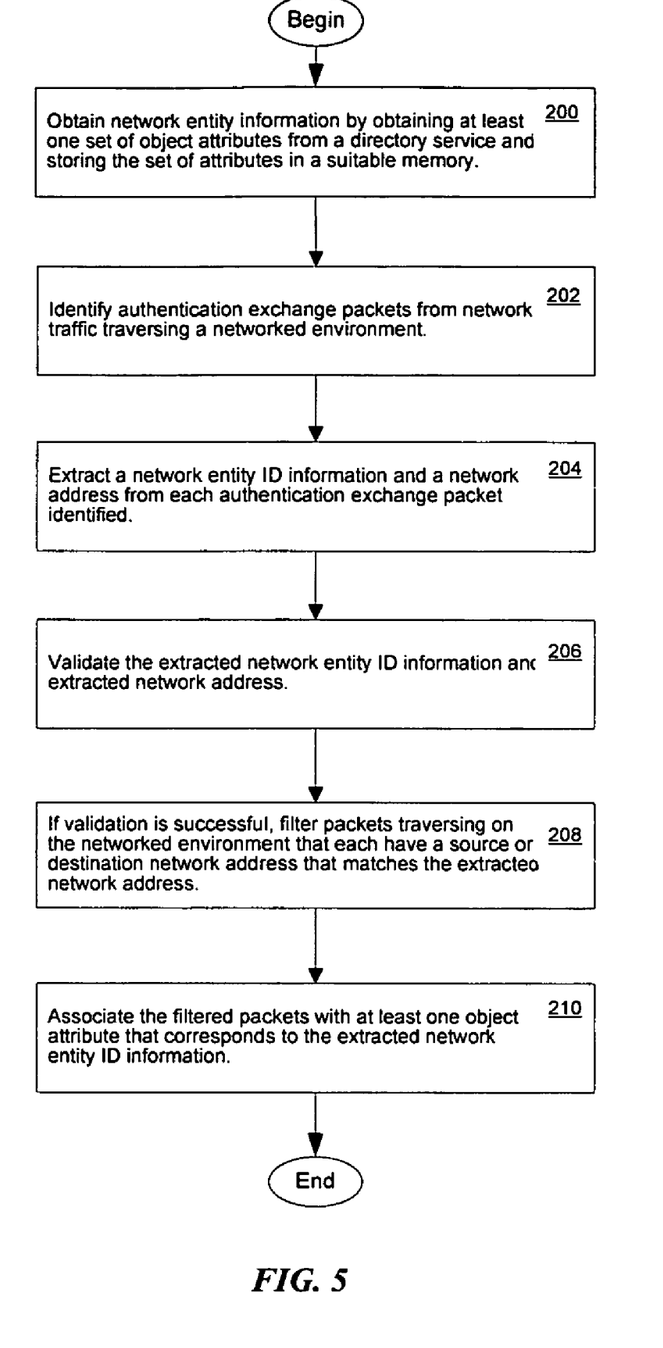
FIG. 5 is a block diagram flow of an example method for associating certain packets according to a selected category by using a monitor device in accordance with yet another embodiment of the present invention.

Referring now to FIG. 5, a method for associating packets according to a selected category, such as user name, group ID, or organizational unit is shown in accordance with another embodiment of the present invention.

It is contemplated that the method includes using a system, such as system 2, on a networked environment having a directory service, such as networked environment 4 and directory service 14, respectively, as described and shown in FIG. 1 above.

User information is obtained 200 by obtaining at least one set of user object attributes from a directory service and storing the attributes selected in a suitable memory or database. It is contemplated that each set of user object attributes stored, such as user name, group ID and organizational unit attributes, corresponds to a real user for whom a user object has been created in the directory service. Those of ordinary skill in the art would readily recognize after receiving the benefit of this disclosure that the various embodiments of the present invention disclosed herein can also applied to other types of objects besides user objects, including printers, computing devices, such as personal computers and personal digital assistants (PDAs). For example, each set of object attributes obtained and stored, may include object attributes pertaining to the names, group ids and organizational units of network entities that include services or computing devices.

Authentication exchange packets are identified 202 from network traffic traversing on the networked environment.

A user ID and a network address are extracted 204 from each authentication exchange packet identified. The user ID is in the form of a Kerberos principal name if the authentication exchange packet identified complies with the Kerberos authentication protocol.

In one variation of the embodiment of the present invention shown in FIG. 5, the type of network address extracted is a destination network address if the type of authentication exchange packet selected for identification 202 is an authentication exchange response packet. In another variation, the type of network address extracted is a source network address if the type of authentication exchange selected for identification 202 is an authentication exchange request packet.

The user ID and the extracted network address are validated 206. Validation of the extracted user ID may be accomplished by, for example, determining whether the extracted user ID includes a user name that matches a user name attribute from one of the set of user object attributes previously stored in memory store 20. If a match is found, the extracted user ID is deemed successfully validated.

Validation of the extracted network address may be accomplished by determining whether a real user is logged on to the client that initiated the authentication exchange. In one embodiment of the present invention, this may be accomplished by using the extracted network address in a hostname request that is sent to a name service on the networked environment. Upon receiving the hostname request, the name service will perform a reverse look-up. If a hostname exists that has been assigned to a client having the same network address as the extracted network address, the name service will reply with that hostname. If the hostname is returned, control software 38 sends a user account query to the client having the hostname. The client having the hostname responds to the user account query by returning a list of user accounts currently logged onto the client at the time the user account query is received. Control software 38 reviews the list of user accounts and if it finds, a user account having a user name matching the extracted user ID, which in this example is a user name, control software 38 deems valid the extracted network address.

If the extracted user ID and extracted network address are successfully validated, network traffic traversing on the networked environment are filtered 208 for packets having a network address, which may be a source network address or destination network address, matching the extracted network address. These filtered packets, if found, are then associated 210 with at least one of the object attributes stored in memory store 20 that corresponds to the extracted user ID. This association may be accomplished by assigning a unique index to the identified packets and the set of user object attributes having the user name attribute that matched the extracted user ID and if desired, by storing the identified packets in a suitable memory store for later retrieval, analysis or both. By providing this type of association between or among packets traversing on a networked environment and selected user information, such as user name, group ID, organizational unit or any combination of these attributes, one can monitor the network traffic generated by a real user that corresponds to the selected user information.

The method disclosed in FIG. 5 is not intended to be limited to the order listed but may be implemented in any order sufficient to successfully perform the method. In addition, in accordance with yet another embodiment of the present invention, filtering 208 for packets having a network address matching the extracted network address may be performed without validating 206 the extracted user ID and extracted network address.

While the present invention has been described in particular embodiments, it should be appreciated that the present invention should not be construed as limited by such embodiments. Rather, the present invention should be construed according to the claims below.

What is claimed is:

1. A computer implemented method for associating packets according to user information defined in a directory service available through a networked environment, the networked environment providing an authentication service and a name service and including at least one client, the method comprising:
at a collector, obtaining user information from the directory service by obtaining at least one user object attribute set from the directory service, the directory service maintaining a directory of objects in a hierarchical framework, each of the objects representing a network entity and one or more attributes of the network entity, the hierarchical framework categorizing each of the objects as one of:
a resource;
a service; and
a person;
at a monitor configured to connect to the collector,
identifying at least one authentication exchange packet from packets traversing on the networked environment;
extracting a first user ID and a first network address from the authentication exchange packet;
filtering packets traversing on the network environment that each have a network address equivalent to the first network address; and
at the collector, associating packets found in the filtering with the user information having a user name attribute equivalent to the first user ID.

2. The method of claim 1, further comprising:
validating the first user ID and first network address; and
performing the filtering and the associating only if the first user ID and the first network address are found valid in the validating.

3. The method of claim 1, further comprising:
validating the first user ID; and
performing the filtering and the associating only if the first user ID is found valid in the validating.

4. The method of claim 1, wherein the associating packets enables the monitoring of packets generated by a real user that corresponds to the user information having the user name attribute equivalent to the first user ID.

5. The method of claim 1, wherein the obtaining user information further comprises: storing the at least one user object attribute set in a memory store.

6. The method of claim 1, wherein each of the at least one user object attribute set includes a user name attribute.

7. The method of claim 6, wherein the each of the at least one user object attribute set further comprises a group ID attribute and organizational unit attribute corresponding to a real user for whom a user object has been created in the directory service.

8. The method of claim 1, wherein the associating packets includes assigning a unique index to the packets found and to one of the at least one user object attribute set having the user name attribute.

9. The method of claim 1, wherein the validating includes determining whether the first user ID includes a user name that matches a user name attribute from one of the user object attribute set, and if the match is found, finding the first user ID valid.

10. The method of claim 1, wherein the validating further comprises determining whether a user account is logged on to a client that sent the authentication exchange packet.

11. The method of claim 10, wherein the determining comprises:
using the first network address in a hostname request; and
sending the host name request to the name service.

12. The method of claim 11, wherein the determining further comprises:

receiving a hostname from the name service and using the first user ID in a user account query;

sending the user account query to a client having the hostname; and finding the first network address valid if the client responds with a user account that includes a user name equivalent to the first user ID.

13. The method of claim 12, wherein the sending the user account query includes using the SMB protocol.

14. The method of claim 1, wherein the authentication service uses the Kerberos protocol during network authentication and the first user ID is in the form of a Kerberos principal name.

15. The method of claim 1, wherein the extracting further comprises
   extracting a second user ID and a second network address from another authentication exchange packet; and
   associating packets found in the filtering with the user information having a user name attribute equivalent to the second user ID.

16. The method of claim 1, wherein the first network address is a destination network address if the authentication exchange packet is an authentication exchange response packet.

17. A system for associating packets according to user information defined in a directory service available through a networked environment, the networked environment providing an authentication service and a name service and including at least one client, the system comprising:
   a memory;
   a monitor configured to receive packets traversing through the networked environment;
   a collector configured to connect to the monitor and the networked environment, the collector configured to obtain user information from the directory service by obtaining at least one user object attribute set from the directory service, the directory service maintaining a directory of objects in a hierarchical framework, each of the objects representing a network entity and one or more attributes of the network entity, the hierarchical framework categorizing each of the objects as one of:
      a resource;
      a service; and
      a person;
   wherein the monitor is configured to:
      identify at least one authentication exchange packet from the packets;
      extract a first user ID and a first network address from the authentication exchange packet; and
      filter packets from the packets that each have a network address equivalent to the first network address; and
   wherein the collector is configured to associate packets filtered by the monitor with one of the at least one user object attribute set having a user name attribute equivalent to the first user ID.

18. The system of claim 17, further comprising a memory store for storing the user information and the filtered packets having the network address.

19. The system of claim 18, wherein the memory store comprises a database server accessible using the networked environment.

20. The system of claim 18, further comprising a means for responding to a client query requesting packets associated with the user name, the means for responding having access to the memory store.

21. The system of claim 17, wherein the monitor comprises a packet processing engine having at least one network port configured to couple to the networked environment.

22. The system of claim 21, wherein the collector comprises a first computing device and the monitor further comprises a second computer device coupled to the packet processing engine and the first computing device.

23. The system of claim 17, wherein the networked environment comprises a network tap configured to send the packets to the monitor without impeding the routing of the packets on the networked environment.

24. The system of claim 17, wherein the networked environment comprises a network switch having a span port.

25. The system of claim 17, wherein the networked environment comprises a network switch having a mirror port.

26. The system of claim 17, wherein
   the collector is configured to validate the first user ID and first network address; and
   the monitor is configured to perform the filtering and the collector is configured to perform the associating only if the collector finds the first user ID and the first network address valid.

27. The system of claim 17, wherein
   the collector is configured to validate the first user ID; and
   the monitor is configured to perform the filtering and the collector is configured to perform the associating only if the collector finds the first user ID valid.

28. The system of claim 17, wherein:
   the monitor is further configured to extract a second user ID and a second network address from another authentication exchange packet, and filter packets from the packets that each have a network address equivalent to the second network address; and
   the second network address is a destination network address if the authentication exchange packet is in the form of an authentication exchange response packet.

29. A system for associating packets according to user information defined in a directory service used in a networked environment, the networked environment providing an authentication service and a name service, the system comprising:
   a monitor that includes means for receiving packets traversing through the networked environment;
   a collector configured to connect to the monitor and the networked environment, the collector having a means for processing user information from the directory service by obtaining at least one user object attribute set from the directory service, the directory service maintaining a directory of objects in a hierarchical framework, each of the objects representing a network entity and one or more attributes of the network entity, the hierarchical framework categorizing each of the objects as one of:
      a resource;
      a service; and
      a person;
   wherein the monitor further comprises a means for identifying at least one authentication exchange packet from the received packets, a means for extracting a user ID and a first network address from the authentication exchange packet, and a means for filtering packets from the received packets that each have a network address equivalent to the first network address; and
   wherein the collector further comprises a means for associating packets filtered by the means for filtering with one of the at least one user object attribute set having a user name attribute equivalent to the user ID.

30. The system of claim 29, further including a memory for storing the user information and the filtered packets having the network address.

31. The system of claim 29, further comprising a means for responding to a client query seeking packets associated with the user name, the means for responding having access to the memory store.

32. The system of claim 29, wherein
the monitor further comprises a packet processing engine having a first network interface configured to couple to the networked environment and a second network interface; and
the collector further comprises a third network interface coupled to the second network interface.

33. The system of claim 32, wherein the coupling of the third network interface and the second network interface comprises a computer network.

34. The system of claim 29, wherein the collector comprises a first computing device and the monitor further comprises a second computer device coupled to the packet processing engine and the first computing device.

35. The system of claim 29, wherein
the collector is configured to validate the user ID and first network address; and
the monitor is configured to perform the filtering and the collector is configured to perform the associating only if the collector finds the user ID and the first network address valid.

36. The system of claim 29, wherein
the collector is configured to validate the user ID; and
the monitor is configured to perform the filtering and the collector is configured to perform the associating only if the collector finds the user ID valid.

37. A system for associating packets according to user information defined as part of a networked environment, the system comprising:
a networked environment having at least one client, a database server and a plurality of network services, including a directory service, an authentication service, and a name service, and wherein the user information is maintained by the directory service;
a monitor configured to receive packets traversing through the networked environment;
a collector coupled to the monitor and the networked environment, the directory service maintaining a directory of objects in a hierarchical framework, each of the objects representing a network entity and one or more attributes of the network entity, the hierarchical framework categorizing each of the objects as one of:
a resource;
a service; and
a person;
a collector coupled to the monitor and the networked environment;
wherein the monitor is configured to:
identify an authentication exchange packet from the packets received, the authentication exchange packet having a user ID and network address;
identify packets received that have the network address; and
send the packets identified to the collector; and
wherein the collector is configured to:
obtain user information corresponding to the user ID by querying the directory service using the user ID; and
associate the packets identified with the user information.

38. The system of claim 37, wherein the monitor comprises a packet processing engine having at least one network port configured to couple to the networked environment and to receive the packets traversing through the networked environment.

39. The system of claim 38, wherein the collector and the monitor are each implemented using a general purpose computing device, respectively.

40. The system of claim 37, wherein:
the collector and the monitor are implemented using a single general purpose computing device; and
the computing device, comprises a first network interface configured to receive the packets traversing through the networked environment, and a second network interface configured to couple to a computer network of the networked environment.

41. The system of claim 37, wherein
the collector is configured to validate the user ID; and
the monitor is configured to identify the packets received and the collector is configured to associate the packets identified only if the collector finds the user ID valid.

42. A computer program embodied on at least one computer-readable medium for executing a method for associating packets according to user information defined in a directory service available through a networked environment, the networked environment providing an authentication service and a name service and including at least one client, the method comprising:
at a collector, obtaining user information from the directory service by obtaining at least one user object attribute set from the directory service, the directory service maintaining a directory of objects in a hierarchical framework, each of the objects representing a network entity and one or more attributes of the network entity, the hierarchical framework categorizing each of the objects as one of:
a resource;
a service; and
a person;
at a monitor configured to connect to the collector,
identifying at least one authentication exchange packet from packets traversing on the networked environment;
extracting a first user ID and a first network address from the authentication exchange packet; and
selecting packets traversing on the network environment that each have a network address equivalent to the first network address; and
at the collector, associating packets found in the selecting with the user information having a user name attribute equivalent to the first user ID.

43. The computer program of claim 42, further comprising:
validating the first user ID and first network address; and
performing the selecting and the associating only if the first user ID and the first network address are found valid in the validating.

44. The computer program of claim 42, further comprising:
validating the first user ID; and
performing the selecting and the associating only if the first user ID is found valid in the validating.

45. The computer program of claim 42, wherein the associating packets enables the monitoring of packets generated by a real user that corresponds to the user information having the user name attribute equivalent to the first user ID.

46. The computer program of claim 42, wherein the processing further comprises: storing the at least one user object attribute set in a memory store.

47. The computer program of claim 42, wherein each of the at least one user object attribute set include the user name attribute.

48. The computer program of claim 47, wherein the each of the at least one user object attribute set further comprises a group ID attribute and organizational unit attribute that both correspond to a real user for whom a user object has been created in the directory service.

49. The computer program of claim 47, wherein the associating packets includes assigning a unique index to the packets found and to one of the at least one user object attribute set having the user name attribute.

50. The computer program of claim 42, wherein the validating includes determining whether the first user ID includes a user name that matches a user name attribute from one of the user object attribute set, and if the match is found, finding the first user ID valid.

51. The computer program of claim 42, wherein the validating further comprises determining whether a real user is logged on to a client that sent the authentication exchange packet.

52. The computer program of claim 51, wherein the determining comprises:
using the first network address in a hostname request; and
sending the hostname request to the name service.

53. The computer program of claim 52, wherein the determining further comprises:
receiving a hostname from the name service and using the first user ID in a user account query;
sending the user account query to a client having the hostname; and
finding the first network address valid if the client responds with a user account that includes a user name equivalent to the first user ID.

54. The computer program of claim 53, wherein the sending the user account query includes using the SMB protocol.

55. The computer program of claim 42, wherein the authentication service uses the Kerberos protocol during network authentication and the first user ID is in the form of a Kerberos principal name.

56. The computer program of claim 42, wherein the first network address is a destination network address and the authentication exchange packet is an authentication exchange response packet.

57. The computer program of claim 42, wherein
the extracting further comprises extracting a second user ID and a second network address from another authentication exchange packet; and
associating packets found in the selecting with the user information having a user name attribute equivalent to the second user ID.

* * * * *